July 25, 1972  M. R. DEMBIAK ET AL  3,679,503

METHODS OF MAKING SHIELDED ELECTRICAL CABLE

Original Filed March 24, 1969

INVENTORS
M. R. DEMBIAK
G. H. WEBSTER

BY E. W. Somers

ATTORNEY

United States Patent Office 3,679,503
Patented July 25, 1972

3,679,503
METHODS OF MAKING SHIELDED ELECTRICAL CABLE
Matthew Raymond Dembiak, Clifton, N.J., and George H. Webster, Timonium, Md.; said Webster assignor to Bell Telephone Laboratories, Incorporated, Murray Hill, N.J., said Dembiak assignor to Western Electric Company, Incorporated, New York, N.Y.
Original application Mar. 24, 1969, Ser. No. 809,547, now Patent No. 3,551,586, dated Dec. 29, 1970. Divided and this application June 11, 1970, Ser. No. 45,343
Int. Cl. H01b 13/10
U.S. Cl. 156—54          6 Claims

ABSTRACT OF THE DISCLOSURE

A metallic tape, having a release agent material applied selectively in at least one longitudinal strip on one major surface thereof, has a coating of adhesive over the strip and both major surfaces. The tape is wrapped longitudinally about a cable core, with the one major surface facing the core, to form an overlapped seam which is then heated to bond the adhesive on the one major surface to the adhesive on the other major surface. The strip of release agent material may be easily removed together with the overlying adhesive to bare the metal to facilitate grounding at a splice location.

---

This is a division of application Ser. No. 809,547, filed Mar. 24, 1969, now Pat. No. 3,551,586.

BACKGROUND OF THE INVENTION

(1) Field of the invention

This invention relates to a method of making a shielded electrical cable, and more particularly, to a method of making an electrical cable having a sealed metallic barrier including a strip of a release material which may be easily removed from the barrier to bare the metal and facilitate grounding at splice locations.

(2) Technical considerations and the prior art

In the cable industry, it is well known that changes in the ambient conditions lead to differences in vapor pressure between the inside and the outside of a plastic cable sheath which generally operates to diffuse moisture in a unidirectional manner from the outside of the cable to the inside of the cable. This eventually will lead to an undesirably high moisture level inside the cable, especially if a polyethylene jacket is the only barrier to the ingress of the moisture and, high moisture levels inside a cable sheath will have a detrimental effect on the transmission characteristics of the cable.

Polyethylene which is used in the jacketing of cable, prevents the passage of water only on a microscopic scale. Where cables are in use the periods of 20 to 40 years and where the conductors within the cables are sensitive to the presence of moisture, it becomes necessary to consider methods of preventing the ingress of moisture into the cable not only on a microscopic but also on a molecular level.

A metallic barrier which is wrapped around a cable core is an effective barrier against diffusion of moisture into the cable core. Telephone cable of this construction is referred to in the art as "Alpeth" cable and is described more fully in the F. W. Horn and R. B. Ramsey paper "Bell System Cable Sheath Problems and Designs" in A.I.E.E. Proceedings 1951, volume 70. The metallic barrier, including a metallic shielding strip or tape, for example aluminum, may be corrugated transversely prior to being wrapped about the cable core in order to give greater flexibility to the cable and to permit bending of the completed cable without wrinkling or rupture of the shielding strip.

Since most communications require an electrically conductive metallic shield to protect against external electrical signals, it is usually desirable to incorporate the shielding function with the moisture barrier function in one layer of metal. Good electrical continuity is a requisite of an acceptable shielding material.

Underground cables are generally exposed to ground water penetration, and thus, to more severe corrosive conditions. The corrosion problem in buried telephone cables is serious enough to suggest the consideration of replacing of aluminum shielding tape with more expensive metals. However, tests have shown that even copper tape will not extend the useful life of underground cables enough to provide the optimum life span which is dictated by the economics of telephone installation. Other solutions, such as the use of tapes of noble metals and flooding of the cable with protective compounds have been heretofore proposed, but have not been widely, if at all, accepted.

If the barrier is made from a single strip of metal, such as aluminum, in the form of a tape, which is wrapped longitudinally about the cable to overlap the edge portions, the effectiveness of the strip as a moisture barrier or shield is enhanced substantially if the seam between the overlapping edge is sealed. More particularly, a seal is most effective in which a metal-to-metal bond of the overlapping edge portions is accomplished, for example, by welding or soldering. Generally though, the materials which are used as a shield are temperature sensitive and easily damaged if overheated. These characteristics render the use of welding, as a sealing technique, impractical because of the high temperature involved in most ordinary welding processes. Moreover, the aluminum, because of its highly reactive nature, generally maintains an oxide film which virtually precludes continuous soldering as a joining technique in situations such as manufacturing of a cable sheath. Therefore, other methods have been devised for sealing the overlapping edges of the seam of the aluminum longitudinally wrapped, shield.

After the metallic strip of say aluminum, is folded about the cable core to form a tube, an outer jacket of polyethylene is extruded over the tube. As the polyethylene cools, the polyethylene material contracts. The cooling proceeds from the outer surface of the jacket inwardly with the shrinkage forcing the polyethylene into close engagement with the surface of the longitudinally folded strip and slides the overlapping edge portions of the metallic strip relative to each other to partially collapse the shield. The relative sliding movement of the overlapping edge portions is stopped when the tubular shield is supported against the cable core. During this shrinkage, the outer overlapping edge of the folded strip presses outwardly into the plastic jacket thereupon reducing the effective jacket thickness radially outward from the strip edge.

In order to improve the corrosion resistance of the barrier and eliminate the slippage along the seam, an adhesive copolymer such as an ethylene acid copolymer and more particularly ethylene copolymer containing acrylic acid as well as the partially neutralized forms of these thermoplastic adhesive copolymers may be applied to both sides of the metallic strip to form a shielding layer. The adhesive copolymer which is applied as a film has high electrical resistivity, high resistance to chemicals and moisture, and good adhesion to the aluminum to withstand manufacturing processes, such as corrugating and longitudinal folding, and to prevent delaminations in corrosive environments. The application of adhesive copolymers in laminates is discussed by B. Wargotz in an article "Environmental Stability of Eethylene-Acrylic Acid Adhesive Copolymers Bonded to Metal Substrates" published in vol. 12 of the Journal of Applied Polymer Science, pages 1873–1888 (1968). Adhesive copolymers also develop a firm bond between the metallic strip and the outer polyethylene jacket. Usually, a metallic, for example aluminum, tape is precoated on both sides with the adhesive copolymer, across the entire width thereof, after which the precoated tape is folded longitudinally about the cable core.

When a polyethylene jacket is extruded over the metallic barrier, the heat from the semimolten polyethylene bonds the metal strip to the jacket. If the heat imparted to the polyethylene is sufficiently high, the aluminum tape will become hot enough so that the overlapped portions of the barrier bond together at the seam. The coated metallic strip firmly adheres to the outer jacket to further inhibit the penetration of moisture. The use of a shielding layer with a sealed seam also has been shown to have higher strength characteristics necessary to withstand repetitious bending of the cable.

Although the desired bond between the outer jacket and the core and the prevention of moisture penetration is solved by the use of a coated metallic strip, problems arise in terminating and splicing the cables. In a splice case, for example, it is required that an inner sheath clamp be placed over the core and in contact with the inner surface of the metallic strip. An ear is formed at each end of the sheath clamp which protrudes through slots cut in the metallic strip and are exposed for engagement with a grounding clamp. Because of the intimate bond between the metallic strip and the copolymer coating, it is difficult to bare the metallic strip to make electrical contact with the inner sheath clamp.

Of course, the cable could be manufactured with something less than an intimate bond between the jacket and the shield to facilitate splicing and grounding while still providing corrosion portection for the metal shielding strip. However, any reduction in adhesive at the interface will be matched by a corresponding reduction in the absolute resistance to moisture penetration.

In at least one prior art patent, this general problem is recognized. Accordingly, in that disclosure, firm adhesion of the adhesive copolymer is restricted to only a portion of the interface between the jacket and the shielding layer. More specifically, the metallic strip is coated with the reactive carboxyl group material only along the longitudinal edge portions and for a limited predetermined distance on each side of the strip from the edges. The remainder of the strip is coated with a material having less adhesive qualities or may be coated with the same material over the entire width and then treated along a portion thereof intermediate the edges to reduce the adhesive characteristics of the coating in the portion intermediate the edges (see U.S. Pat. 3,379,821 issued Apr. 23, 1968).

However, in the cable construction just described, protection against moisture penetration depends upon a sealed seam. The absence of an intimate bond between the jacket and the shielding layer around the majority of the periphery unnecessarily increases the chance of moisture penetration through pin holes with subsequent travel of the moisture along the length of the cable between the jacket and the shielding layer. In many splicing operations, it is unnecessary to strip the outer jacket from the metallic shielding layer; and hence, the construction of the cable with reduced adhesive around a major portion of the periphery unnecessarily increases the change of moisture penetration. Moreover, even if it were necessary to strip the outer jacket from the metallic shielding layer in the splice location, it would seem incongruous to reduce the adhesion of the jacket to the shielding layer along the entire length of cable to expedite the stripping function for a short distance along the cable at the splices.

The term "facing" as employed in the specification and claims appended thereto when referring to the relationship between a surface and an object will be understood to mean that the surface is oriented in the direction of the object and may be, but is not necessarily, adjacent to or in contact with the object.

The term "major surface" as employed in the specification and appended claims when referring to surfaces of a strip of material should be understood to include the large faces of the strip and not the edges of the strip even though the faces might have curved, corrugated or otherwise nonplanar configurations and even though the edges might blend smoothly into the faces without any sharp geometrical definition.

The term "polymeric" material as employed in the specification and appended claims will be understood to include both thermoplastic compounds such as polyethylene and polyvinyl chloride or the like, thermosetting compounds as epoxies and polyurethanes and elastomers such as neoprenes.

It is therefore an object of this invention to provide a method of manufacturing a cable having an outer jacket firmly bonded to a metallic shielding barrier with a sealed longitudinal seam in which a major surface of the metallic barrier may be bared to facilitate splicing and grounding operations.

Of course, it is possible to merely coat one major surface of the aluminum strip with the adhesive copolymer but then there would be no adhesive on the other major surface to obtain the desired bond with the adhesive on the one major surface along the overlapped edge portion at the seam. The copolymer on the outer major surface of the aluminum strip will not adhere to the inwardly facing major surface of the aluminum during the normal type extrusion operation so as to obtain the desired seal. In order to obtain a sealed seam, the other major surface of the aluminum strip must be precoated at least along the edge portion thereof with an adhesive, under controlled conditions, during which the aluminum is preheated. Methods have been developed which now permit the selective application of adhesive to only a portion of the other, for example, inwardly facing major surface of the metallic strip. This procedure is disclosed in copending application, Ser. No. 809,589, filed Mar. 24, 1969, by the same inventors, now abandoned.

It is an object of this invention to provide a method of making a cable in which both of the major surfaces of a metallic strip are coated across the entire transverse width thereof with an adhesive material to form a metallic shielding barrier with the provisions for stripping the adhesive material from one of the major surfaces of the strip at predetermined locations.

In a method illustrative of certain features of the invention, successive sections of a core are advanced along a predetermined path. A longitudinal strip of aluminum in the form of a tape is coated on one side thereof with a plurality of longitudinal strips of material comprised of a release agent. A layer of adhesive copolymer is coated on an outwardly facing major surface of the metallic tape and on the inwardly facing major surface over the release agent to form a metallic barrier. The shielded metallic barrier is then wrapped longitudinally about the cable core to overlap the major surfaces of the barrier, and contact the adhesive copolymer on the inwardly facing major surface of the one peripheral edge portion of the barrier with the adhesive copolymer on the outwardly facing major surface of the other peripheral edge portion of the barrier.

An outer jacket of polyethylene is extruded over the outer coated surface of the shielded metallic layer or barrier whereupon heat is applied to successive portions of the overlapped seam to elevate the temperature of the adhesive material to at least the predetermined temperature while maintaining a proper positional relationship between the contiguous adjacent mating portions of the major surfaces of the metallic barrier which face each other at the overlapped seam. The release strips with copolymer superimposed thereon at easily located predetermined spacings are identifiable and readily pulled out of engagement with the metallic tape to pull the copolymer away from the metallic tape and bare the tape for splicing and grounding.

Additional advantages and features of the invention will be better comprehended by reference to the drawing and the detailed descriptions which follows.

DETAILED DESCRIPTION

Figure 1:
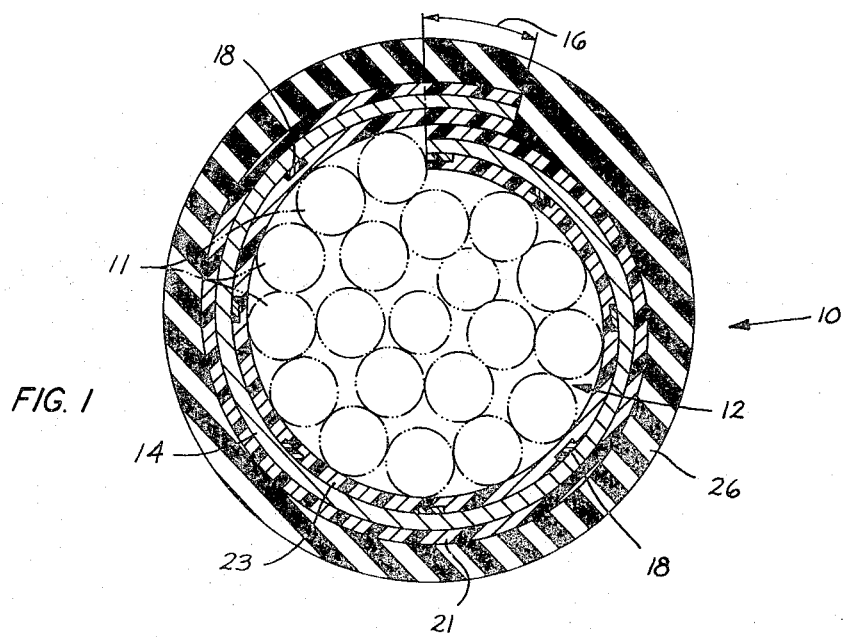
FIG. 1 is a cross-sectional view of a cable manufactured in accordance with the principles of the present invention and showing a cable core with a metallic barrier wrapped longitudinally about the core and having a jacket extruded thereover.

Referring now to FIG. 1, there is shown a portion of a cable, designated generally by the numeral 10, and having a plurality of insulated conductors 11 which comprise a core, designated generally by the numeral 12. The core 12 which is coextensive with the cable 10 and which is enclosed by a core wrap (not shown) comprised of a paper tape or a rubber-polyethylene terephthalate laminate must be protected against moisture and corrosion.

Accordingly, to protect the core 12, a shielding layer or barrier, designated generally by the numeral 13 (see FIG. 2), is formed and is then wrapped longitudinally around the cable 10 to enclose the core. The barrier 13 includes a metal shield 14, for example aluminum, which may be corrugated and which is in the form of a tape.

The shielding layer or barrier 13 functions to help prevent the diffusion of water vapor into the core 12 of the cable 10. In addition to serving the diffusion prevention function, the metallic strip or tape 14 of the barrier 13, operates effectively to absorb the energy from stray electromagnetic fields emanating from sources outside the communications cable 10.

Because the metallic tape 14 serves a dual function, the tape is preferably made from an electrically continuous, electrical conductor grade aluminum alloy approximately 0.008 inch thick. The particular metal and thickness of the metallic tape is not important to this invention; the metal could be copper or brass or any of a number of other conductive materials if dictated by other considerations.

When the metallic tape 14 is wrapped longitudinally about the core 12 with edge portions of the major surfaces of the strip overlapped with each other to form a seam 16, it is necessary to seal the seam to prevent moisture from penetrating into the core and to avoid other problems discussed hereinbefore. In order to seal the longitudinal seam formed by the overlapping edge portion of the metallic tape 14 and simultaneously make provisions for baring an inwardly facing major surface 17 of the metallic tape 14 which faces the core 12 at splicing locations, the tape is selectively precoated with different materials.

Figure 2:
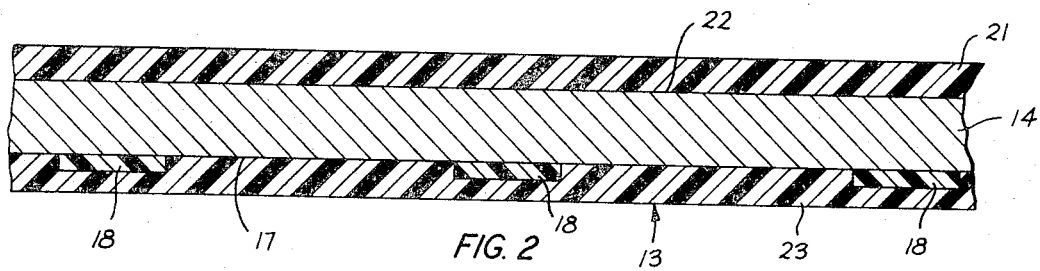
FIG. 2 is an enlarged view of a developed portion of the metallic barrier as shown in FIG. 1 with a plurality of spaced strips of a release agent material coated over the inwardly facing major surface of a metallic tape and having an ethylene acid copolymer coated over the outwardly facing major surface, and over the inwardly facing major surface and strips of release material.

Initially, a polymeric release agent material is coated by conventional techniques or extruded onto the inwardly facing major surface 17 of the aluminum tape 14 which, when wrapped about the advancing core, faces the core (see FIG. 2). The release agent material may be of any commercially available material such as vinyl chloride resins which does not inherently adhere to the aluminum tape 14, but is characterized in that the release agent material may be applied in stripes from a solution. Although the release agent material is polymeric, the release agent material has a degree of adherence to the aluminum tape 14 which is substantially less than an ethylene acrylic acid copolymer, and is readily peelable from the aluminum tape.

Figures 3, 5:
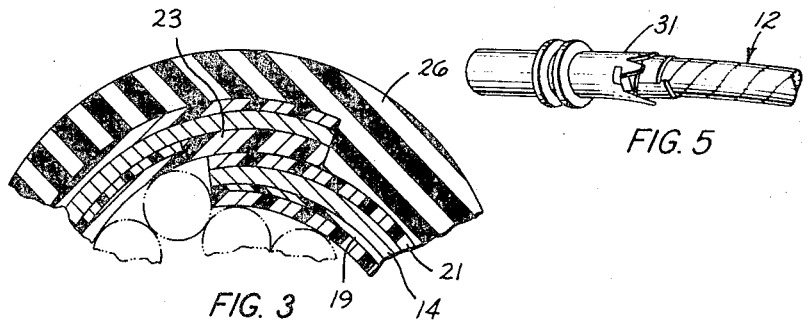
FIG. 3 is a fragmentary end sectional view of a cable showing another embodiment of the present invention with release agent material being applied in one continuous width strip over a majority of the inwardly facing major surface of the tape.
FIG. 5 is a perspective view showing the cable at a splice location with a portion of the metallic barrier and jacket cut away from the cable to permit insertion of a grounding clamp for grounding the cable.

The release agent material may be placed on the inwardly facing major surface 17 of the tape 14 in any of several configurations. For example, a plurality of stripes or strips 18 spaced transversely across the metallic tape 14, as shown in FIG. 2, may be coated or extruded longitudinally along the inwardly facing major surface 17 of the tape 14. Or alternatively, as shown in FIG. 3, a layer 19 of the peelable material may be coated over the aluminum tape 14 except for a narrow longitudinal edge portion on the inwardly facing major surface 17 of the tape.

Then, in order to seal the longitudinal seam 16 along the overlapped portions of the major surfaces of the aluminum tape 14, an ethylene acid copolymer such as an ethylene acrylic acid copolymer is applied to form a layer 21 on an outwardly facing major surface 22 of the tape 14 (see FIG. 2). This adhesive copolymer which is a heat sensitive material, is available from the Dow Chemical Company of Midland, Mich., under description Copolymer Resin QX2375.0. Simultaneously, or subsequently, a layer 23 of the same adhesive copolymer as that which comprises layer 21, is coated over the peelable strips 18 of the release agent material and over the remaining bared portions of the surface 17 of the aluminum tape 14, as shown in FIG. 2.

In order for an installer to be able to quickly identify the strips of release agent material, the release material should be visually distinguishable from the adhesive copolymer. The peelable strips 18 are constructed of a material having a distinct color and the overlying coating layer 23 is of sufficient transparency to render the underlying strip discernible.

Generally, the metallic tape 14 precoated with the adhesive copolymer layer 21 is a commercially purchased item and is available, for example from the Dow Chemical Company under the designation, Zetabond 280.

Then the moisture barrier 13 which includes the metallic tape 14 sandwiched between adhesive copolymer layers 21 and 23 with peelable strips 18 of a release material interposed between the adhesive copolymer layer 23 and the inwardly facing major surface 17 of the strip 14 is assembled to the core 12. The barrier 13 including the precoated metallic tape 14 is folded longitudinally about the advancing core 12 by a tube forming device, designated generally by the numeral 24, to enclose the core and to form the overlapping seam 16 between the inwardly facing major surface of the tape and the outwardly facing major surface thereof. The heat sensitive copolymer material has the ability to develop a mechanical and a chemical bond to the aluminum tape 14 and also bonds to the peelable strips 18 and to an overlying jacket 26 (see FIG. 1) comprised of polyethylene or other suitable plastic insulating material.

Figure 4:
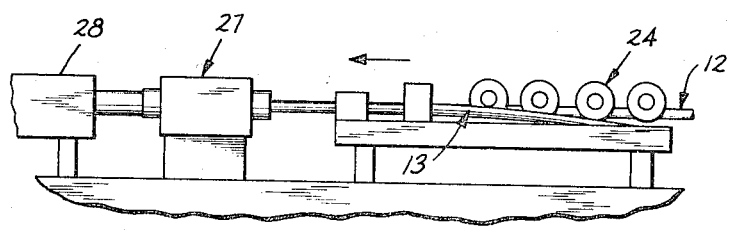
FIG. 4 is a simplified elevational view showing an apparatus used to practice the method which embodies the principles of this invention to advance a metallic tape and then to wrap the tape around the advancing core and extrude a jacket thereover.

Then, the enclosed core is advanced to, and through, a conventional plastic extruder, designated generally by the numeral 27 (see FIG. 4) which is used to extrude the circumferential jacket 26 of polyethylene over the shielding layer 13. The resistance of the cable 10 against the penetration of moisture is further improved by applying the polyethylene jacket 26 to the outwardly facing major surface of the adhesive copolymer layer 21 under extruding temperatures which are designed to yield optimum bonding of the polyethylene to the barrier 13. Molten polyethylene may be fed from the extruder 32 at a temperature of from 375° F. to 475° F. It is more desirable to restrict the temperature range to one of 25° F. between 425° F. and 450° F.

As the core 12 and barrier 13 are advanced through the extruder 27, the overlapped seam 16 is sealed. There is sufficient heat within the polyethylene so that the heat transfer takes place into the adhesive copolymer layers 21 and 23 and into the metallic tape 14. As a result of the heat transfer from the polyethylene jacket 26 into the adhesive copolymer layers 21 and 23, the temperature of the adhesive copolymer is raised sufficiently to bond the overlying copolymer coatings of the overlapped portions of the major surfaces at the overlapping seam 16 together and to simultaneously bond the copolymer layer 21 to the jacket 26.

After the polyethylene jacket 26 has been extruded onto the core 12 and the moisture barrier 13, provisions must be made to prevent an excessive amount of heat flowing from the hot plastic jacketing material inwardly toward the core. This sometimes damaging heat flow is impeded by rapidly chilling the plastic jacket 26, with any of several apparatuses 28 well known in the art (see FIG. 4).

Alternately, the overlapped bonded seam 16 may be formed independently of the jacket extrusion. Successive portions of the metallic tape 14, precoated with the adhesive copolymer may be drawn into an induction-heating unit similar to those units disclosed in U.S. Pats. 2,758,189, 2,801,316 and 2,925,485 which issued on Aug. 7, 1956, July 30, 1957, and Feb. 16, 1960, respectively, to D. A. Hughes.

A section of the subassembled cable 10 which has been covered by the precoated metallic tape 14 is advanced through the induction-heating unit (not shown) in which high frequency magnetic fields develop currents within the overlapped seam portion 16 of the metallic barrier 13, to heat the seam portion. By properly controlling the power to the induction-heating unit with conventional control equipment (not shown), sufficient heating may be provided to bond the seam 16 without degradation of the copolymer layers 21 and 23 and without damage to the core 12. A water-quenching station (not shown) is located immediately adjacent the exit end of the induction-heating unit (not shown) to spray water at ambient temperature onto the seam 16 to cool the seam while maintaining pressure thereon.

After the metallic barrier 13 is bonded into a tubular shape on the core 12, the subassembled cable 10 may be wound on a reel (not shown). Then the subassembled cable 10, including the core 12 and tubular metallic barrier 13, may be advanced into the extruder 27, and the polyethylene jacket 26 applied to the outside of the metal covered core unit.

One of the advantages in using a metallic barrier application technique which consists of a two step operation of heating, and later jacketing, is that the integrity of the sealed overlapped seam 16 can be checked before the polyethylene jacket 26 is applied. Various techniques can be used to check the integrity of the seal. One such technique is described in U.S. Pat. 2,988,917, issued on June 20, 1961, to C. A. Hallam et al. If defects are found in the sealed overlapped seam 16, the continuous forming and sealing operation can be stopped long enough to allow a repair to be made to the defective portion of the seam. Conventional control systems (not shown) are readily available that monitor the amount of heat to be applied to the seam 16 through the induction-heating unit (not shown) as the core 12 is started and stopped when repairs are required.

The use of a forming, sealing, and seam integrity checking system, independently of a jacket extrusion operation, permits the interruption of the manufacturing of the cable 10 to make repairs. The impairment of the efficiency of an extrusion operation which would ordinarily result from a starting or stopping of the cable to make repairs is thereby avoided.

If circumstances were to make it unimportant to be able to start and stop the forming and sealing operation, the application of the jacket 26 could be accomplished in a tandem operation which the forming and sealing without the intermediate step of taking up the core 12 surrounded by the metallic barrier 13. A conventional device (not shown) for checking the integrity of the overlapped seam 16 could be used to mark faulty areas so that the faulty areas could be repaired or cut out of the cable 10 after the jacket 26 had been applied.

The cable 10 may also be assembled employing the principles of the method of this invention to provide for grounding the outwardly facing major surface 22 of the metallic tape 13. Accordingly, the strips 18 of release agent material are applied to the outwardly facing major surface 22 and then layers 21 and 23 of an ethylene acrylic acid copolymer are coated over the inwardly facing major surface 17 and over the strips 18 and outwardly facing major surface 22.

In carrying out the method of terminating a shielded cable of the structure hereinbefore described, the installer slits longitudinally shield 14 at plural locations about the periphery of the shield, identifies and then peels the strips 18 with sufficient strength to tear the overlying coating from the coating adjacent the strips and bares the inwardly facing major surface 17 of the shield. Then the installer places a clamp 31 around the core and in engagement with the bared portions of the inwardly facing major surface 17 of the shield 14 to establish electrical contact with the clamp (see FIG. 5).

It is to be understood that the above-described embodiments are simply illustrative of the invention and that many other embodiments can be devised without departing from the scope and spirit of the invention.

What is claimed is:

1. A method of manufacturing a cable having a strippable material, which comprises the steps of:
    applying peelable strip material to at least portions of at least one major surface of a sheet of shielding material, the sheet of shielding material having inwardly and outwardly facing major surfaces;
    applying material to bared portions of the at least one major surface of the sheet of shielding material and over the peelable material to cover at least portions of the peelable material;
    advancing successive sections of a cable core along a predetermined path, and
    forming the sheet of shielding material around at least portions of successive sections of the advancing cable core with the inwardly facing major surface of the shielding material facing the core.

2. A method of manufacturing a cable, having strippable adhesive material, which comprises the steps of:
    applying peelable strip material to at least portions of at least one major surface of a sheet of shielding material, the sheet of shielding material having inwardly and outwardly facing major surfaces, further, the sheet of shielding material having spaced minor surfaces, which connect the inwardly and outwardly facing major surfaces;
    applying a heat sensitive adhesive material to at least portions of the opposing major surface, and to portions of the at least one major surface of the sheet of shielding material and over the peelable material to cover at least portions of the peelable material;
    the at least portions of the opposing major surface including a portion thereof adjacent one of the minor surfaces adjacent a peripheral edge of the sheet and the portions of the one major surface including a portion thereof adjacent the one minor surface of the sheet;

advancing successive sections of a cable core along a predetermined path;

folding longitudinally the sheet of shielding material about the core to overlap portions of the major surfaces adjacent the one minor surface to form a longitudinal seam with the inwardly facing major surface facing the core, and heating the successive sections of the overlapped seam to bond the heat sensitive material on the one major surface to the heat sensitive material on the opposing major surface and seal the seam.

3. In the manufacture of an electrical cable having a core with at least one insulated conductor surrounded by a metallic barrier having inwardly and outwardly facing major surfaces;

applying at least one visually identifiable longitudinal strip of a release agent material to one major surface of said barrier;

coating the one and the other major surfaces of said metallic barrier with an adhesive copolymer material to cover the metallic barrier and the release agent material, said adhesive material capable of developing a bond to other of said adhesive material upon application of heat;

folding longitudinally said barrier around said core to form an overlapped seam with an inwardly facing major surface of the barrier facing the core, and applying heat to successive portions of the overlapped seam to heat the adhesive material to develop a bond between the adhesive materials and seal the seam.

4. A process of manufacturing a cable which comprises the steps of:

advancing successive sections of a cable core along a predetermined path;

forming a longitudinal band of a release material along one major surface of a metallic tape;

coating both major surfaces of the metallic tape with a nonmetallic adhesive to cover the release material and the metallic tape, said adhesive material capable of bonding to other adhesive material of identical composition at a predetermined temperature;

wrapping longitudinally the metallic tape around successive portions of the advancing cable core to form a tubular shield with an overlapped seam, with the tubular shield having inwardly and outwardly facing major surfaces, the inwardly facing major surface facing the core, and applying heat to successive portions of the overlapped seam to elevate the temperature of the adhesive material to at least the predetermined temperature to develop a bond between the adhesive materials.

5. A method of terminating a shielded cable wherein the shield of the cable is coated with insulating material and a peelable strip is embedded in the coating of insulating material in contiguous relationship with one of the major surfaces of the shield, which comprises:

applying peeling forces of sufficient magnitude to peel the strip from the shield and tear the overlying coating from the coating on the one major surface of the the shield which is adjacent the strip to bare the one major surface of the shield, and applying an electrical connection to the bared shield.

6. A method of terminating a shielded cable having a core wherein the shield of the cable is coated on outwardly and inwardly facing major surfaces thereof and with a plurality of strips of a peelable material embedded in the coating on the inwardly facing major surface of the shield in contiguous relationship with the inwardly facing major surface of the shield, which comprises:

slitting longitudinally said shield at plural locations about the periphery of the shield;

identifying and then peeling said strips with sufficient strength to tear said overlying coating from the coating adjacent the strips and bare the inwardly facing major surface of the shield;

placing a clamp around the core and in engagement with the bared portions of the inwardly facing major surface of the shield, and establishing electrical contact with said clamp.

References Cited

UNITED STATES PATENTS

| 2,985,554 | 5/1961 | Dickard | 156—289 X |
| 3,233,036 | 2/1966 | Jachimowicz | 174—107 |
| 3,379,821 | 4/1968 | Garner | 156—54 X |

BENJAMIN A. BORCHELT, Primary Examiner

H. TUDOR, Assistant Examiner

U.S. Cl. X.R.

174—107, 117